No. 676,497. Patented June 18, 1901.
J. T. HAY.
BALING PRESS.
(Application filed May 27, 1899.)
(No Model.) 9 Sheets—Sheet 1.

Fig. 1.

WITNESSES:
F. W. Woerner
L. A. Minturn

INVENTOR
John T. Hay,
BY
Joseph A. Minturn
ATTORNEY.

THE NORRIS PETERS CO., PHOTO-LITHO., WASHINGTON, D. C.

No. 676,497. Patented June 18, 1901.
J. T. HAY.
BALING PRESS.
(Application filed May 27, 1899.)
(No Model.) 9 Sheets—Sheet 2.

WITNESSES:
F. W. Woermer
L. A. Minturn

INVENTOR
John T. Hay,
BY
Joseph A. Minturn
ATTORNEY.

No. 676,497. Patented June 18, 1901.
J. T. HAY.
BALING PRESS.
(Application filed May 27, 1899.)
(No Model.) 9 Sheets—Sheet 4.

Fig. 4.

WITNESSES:
F. W. Woerner.
D. A. Minturn

INVENTOR
John T. Hay,
BY
Joseph H. Minturn
ATTORNEY.

No. 676,497. Patented June 18, 1901.
J. T. HAY.
BALING PRESS.
(Application filed May 27, 1899.)
(No Model.) 9 Sheets—Sheet 6.

Fig. 6.

WITNESSES:
F. W. Woerner.
L. A. Minturn

INVENTOR
John T. Hay,
BY
Joseph A. Minturn
ATTORNEY.

No. 676,497. Patented June 18, 1901.
J. T. HAY.
BALING PRESS.
(Application filed May 27, 1899.)
(No Model.) 9 Sheets—Sheet 7.

WITNESSES: INVENTOR.
John T. Hay,
BY Joseph A. Minturn,
ATTORNEY.

No. 676,497. Patented June 18, 1901.
J. T. HAY.
BALING PRESS.
(Application filed May 27, 1899.)
(No Model.) 9 Sheets—Sheet 8.

WITNESSES:
F. W. Woerner.
L. A. Minturn.

INVENTOR
John T. Hay,
BY
Joseph A. Minturn
ATTORNEY.

No. 676,497. Patented June 18, 1901.
J. T. HAY.
BALING PRESS.
(Application filed May 27, 1899.)
(No Model.) 9 Sheets—Sheet 9.

WITNESSES:
F. W. Woerner,
L. A. Minturn

INVENTOR
John T. Hay,
BY
Joseph A. Minturn
ATTORNEY.

THE NORRIS PETERS CO., PHOTO-LITHO., WASHINGTON, D. C.

UNITED STATES PATENT OFFICE.

JOHN T. HAY, OF UNION CITY, OHIO.

BALING-PRESS.

SPECIFICATION forming part of Letters Patent No. 676,497, dated June 18, 1901.

Application filed May 27, 1899. Serial No. 718,514. (No model.)

*To all whom it may concern:*

Be it known that I, JOHN T. HAY, a citizen of the United States, residing at Union City, in the county of Darke and State of Ohio, have invented certain new and useful Improvements in Baling-Presses, of which the following is a specification.

This invention relates to machines for compressing hay, straw, excelsior, and similar materials into bales and to retain the form and compression of the bales by wrapping them with wires or cords and tying the latter to form continuous bands around the bales.

The object of the invention is to provide a continuously-operating machine which will automatically compress the material into bales and wrap and tie the binding wires or cords around the bale to secure it without danger of choking or overfeeding the machine while the binding and tying is going on and without interfering in any way with the uniform operation of feeding the material to the press.

The object also is to make a smooth and secure tie of the bale-band, comprising interlocking eyes or loops made by crossing the ends and doubling them back onto and twisting them with the adjacent body of the band; and a further object of the invention is to wrap and tie the bale without wasting any of the band material.

The object also is to materially increase the capacity of this class of machines and to render them more durable in construction and certain in operation.

I accomplish the objects of the invention by the mechanism illustrated in the accompanying drawings, in which—

Fig. 8, a like section on the dotted line 8 8 of Figs. 2 and 3; Fig. $8^a$, a detail, on a larger scale, of that part of Fig. 8 showing clutch-sleeve on the shaft connecting the two wire-twisters; Fig. 9, a detail in perspective of the reciprocating rack-bar located on the left-hand side of the machine, the view looking toward the inner or machine side of the bar; Fig. 10, a detail in vertical section on the dotted line 10 10 of Fig. 3; Fig. 11, a detail in side elevation of the rack-bar on the right-hand side of the machine, showing the hooked reciprocating bar attached to the plunger of the press and the manner in which the hook engages notches in the upper side of the rack-bar to actuate same; Fig. 12, a detail in plan view of the end of the needle; Fig. 13, a detail showing construction of knot made in band by my machine, and Fig. 14, a view in perspective of the wire carrying and cutting arm.

Like letters of reference indicate like parts throughout the several views of the drawings.

A represents the body or compression-box of the machine. It is of oblong rectangular form, open at both ends, which may be mounted on wheeled trucks B to render it portable, if desired, or it may be mounted in any other well-known and convenient manner. A power-shaft C is mounted horizontally in the rear end of the body A, and upon one end of the shaft a pulley $c'$ is mounted, which receives power from any suitable motor through a belt $C^2$ running over its periphery. Inside of the compression-box midway of the length of the shaft C is a pinion $c^3$, the teeth of which mesh with those of a gear-wheel $d'$, upon which a shaft D, mounted in a suitable box $d^2$, is supported by the side of the body A. The gear-wheel $d'$ carries the crank-pin $d^3$, to which the pitman $d^4$ is connected and through which connection a reciprocating movement is imparted to the cross-head or plunger E by the pivotal attachment of the pitman to the plunger. The material to be pressed is introduced into the compression-box in front of this plunger and is compressed by the impact of the latter, the said material on the side opposite to the plunger being restrained by the tie-band in part and by the springs $A^7$, which project into the box obliquely from its sides, but give back against the sides of the box A under sufficient pressure, allowing the compressed material to pass.

Secured to each side of the body A near its front end are the laterally-projecting frames F, the horizontal members of which are circular segments described from a common center for each horizontal set of guides. There will be as many horizontal sets of guides as there are tie-bands used to wrap the bales, and these guides will form the runs for the longitudinally-reciprocating curved needles F', which pass after the bale is formed between the plunger and the bale to carry the band across the inner end of the bale. The needles start from the right-hand side of the press and pass through the latter to a suitable distance on the other side, varying with the size of the bale to be made. The needles have a toothed edge $f$, by which they are driven in the manner as will be presently described, and a groove $f'$ running longitudinally along its outer side, into which the tie-band (usually wire) is laid. These wires come from the reels $F^2$ outside of the outer ends of the runs. The wire from the reel passes in the groove around the outside of the needle and around the inner end of the latter, and thence between the bale and the adjacent side of the press to the outer end of the bale, across the outer end of the bale, and thence through a slot in the opposite side of the press to end holding and twisting mechanism hereinafter to be described. The inner end of the needle has the vertical notch $f^2$, and in the bifurcated ends thus produced are friction-rollers $f^3$, (see Fig. 12,) grooved to receive the wire.

Located in the runs at the end of the throw of the needles are the standards $F^4$, adjustable longitudinally of the runs to suit the differences in the lengths of the throws of the needles, and these standards carry the spring-closed hooks $f^4$ to drop into the notched ends of the needles and engage and hold the wires, which will remain looped over the hooks after the needles have returned to their places of starting at the right of the press. The hooks will be provided with any suitable tension device to prevent the too free withdrawal of the wires therefrom.

The throw of the curved needles is accomplished by the mechanism as follows:

$F^5$ is a straight bar secured to the side of the body A in suitable runs to permit longitudinal movement. It has the outside series of cogs $f^5$, and the bar will be referred to hereinafter as the "rack-bar" $F^5$. The top of the bar is provided with a pair of notches $f^6$, the adjacent inner sides of which are at right angles and the outer sides of which are oblique to said top of the bar.

$F^7$ is a shaft supported vertically from and by the side of the body A and having the pinion $f^7$, the teeth of which mesh with the teeth of the rack-bar $F^5$. The shaft $F^7$ also has the gear-wheels $f^{10}$, the teeth of which mesh with the teeth $f$ of the needles F', whereby when the shaft $F^7$ is revolubly moved by the longitudinal movement of the bar $F^5$ the needles will be correspondingly run in or out of the press. The longitudinal movement of the rack-bar $F^5$ is accomplished by the engagement with it of the hooked bar $F^8$. This bar is connected by the wrist-pin $f^8$ with the plunger E, the side of the body A having the slot $a^8$, through which the pin $f^8$ is projected. The front end of the bar $F^8$ has the under side hook $f^9$, which rests upon the top of the rack-bar $F^5$ and engages the notches $f^6$ to move the rack-bar unless interfered with by the guards G or G'. The guard G is an upwardly-tapering plate set midway of the length of travel in the path of the hook $f^9$ and causes the hook lying in the notch to ride up the inclined side of the guard out of the notch, thereby releasing the rack-bar and stopping the throw of the needle. The length of travel or throw of the needle will vary with the size of the bale, and the size of the bale will vary with the relative weights of different materials in proportion to bulk. In baling hay, for example, the bales are required to be as near one hundred pounds in weight as possible, and heavy hay will require less bulk to a hundred pounds than light hay, the bale will be shorter, and the needle will have to travel in each case a distance proportioned to the length of wire needed to go around the bale. To secure this variation in the throw of the needle, the guard G will be in two vertically-divided parts, each of which is adjustable in position longitudinally of the rack-bar $F^5$, whereby the hook $f^9$ will be thrown out of the notch $f^6$ going either way at an earlier or later period of the stroke of the bar $F^8$. This adjustment of the guard G is clearly shown in Fig. 11.

The bar $F^8$ is held in its travel in right position over the rack-bar by the guide-bar $F^9$, which passes through a looped or hooked projection from the side of the bar $F^8$.

As the needle is only to move through the press back of the bale after the latter is finished, it is necessary that the rack-bar be actuated only from the plunger upon the return stroke of the plunger after the last compression has been made, and during the several other strokes required to complete the bale the rack-bar must remain inert. To accomplish this required result, the guard G', consisting of a bar or plate pivoted to stand edge up and adapted to be moved at intervals about its pivot into the path of the hook $f^9$ and throw it out of engagement with the front notch $f^6$ and keep it out of engagement with that notch except on the return stroke of the last compression of the plunger above referred to, when this guard will be automatically removed to allow the hooked bar to engage the front notch of the rack-bar, by which the rack-bar will follow the backward movement of the plunger until the hook is thrown out by the guard G approximately at the middle of its stroke. Completing its stroke the hook travels back and drops into the rear notch, whereby on the return or forward stroke of the hooked bar the rack-bar will be returned to its first position, which withdraws the needle; but in the meantime the guard G' has moved back into the path of the hook $f^9$, where, as before, it will prevent engagement with the front notch $f^6$ until the next bale is completed. To accomplish the automatic action required, the guard G' is pivoted at $g$ to the framework and has the lateral arm $g'$, which is connected by the bar $g^2$ with the crank $g^3$ of the shaft $g^4$. The other end of the shaft $g^4$ has the crank $g^5$, which connects by the bar $g^6$ with the cranked top end of the vertical shaft $g^7$. The shaft $g^7$ has the arm $g^8$, which crosses the path of the needle, and by the contact with it of the cogged flange $f$ the shaft is turned far enough to cause the throw of its cranked top to actuate the cranked shaft $g^4$ in a direction to elevate the guard G' into the path of the hooked bar $F^8$; but the purpose of the contact between the arm $g^8$ and the needle is to set the mechanism ready for the action of other parts yet to be described, whereby the guard G' will be held in the path of the hooked bar $F^8$ by the tension of the band-wires leading to the hooks $f^4$ and will be withdrawn from the path of the bar $F^8$ by the pulling of the wires off of the hooks by the pull of the bale in the press as the latter is filled out to completion and requires the wire to go around it. The arm $g^8$ contacts against but does not engage the teeth of the cogged flange, and to prevent accidental engagement with the teeth the end of the arm will be bent or rounded out, as shown.

Figure 1:
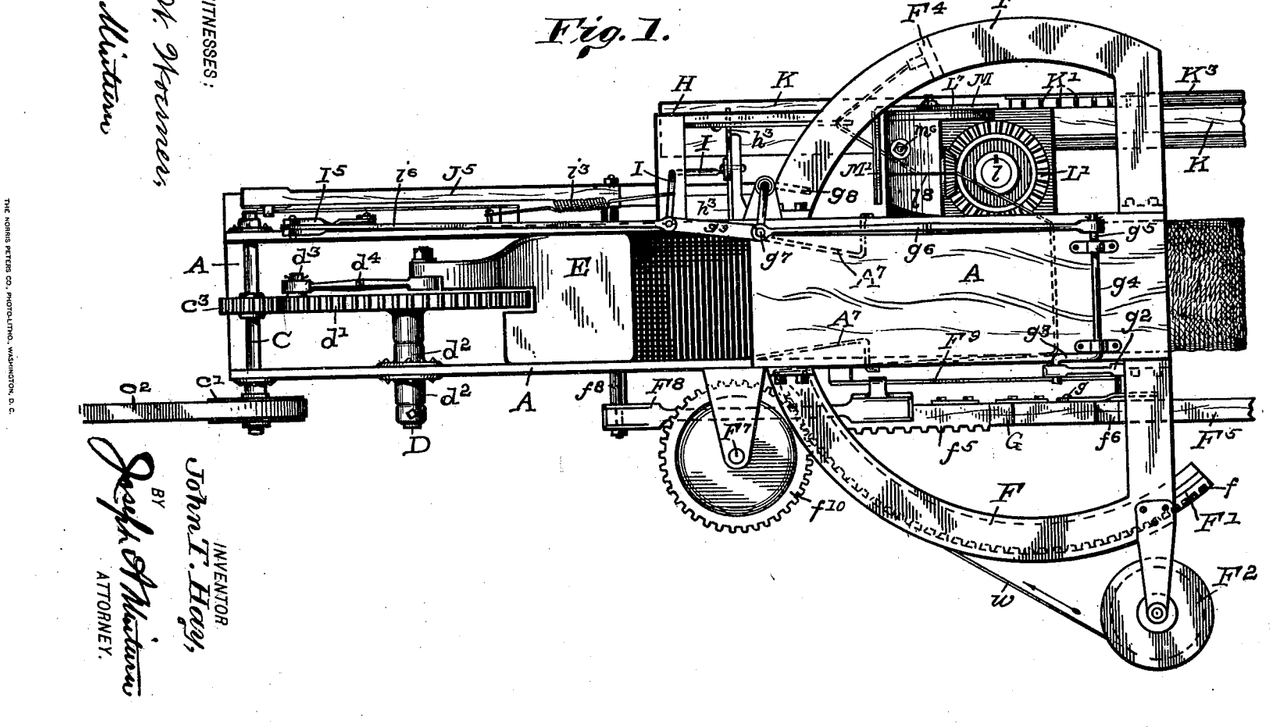
Figure 1 is a top or plan view of my invention in position to begin the formation of a bale.
Figure 2:
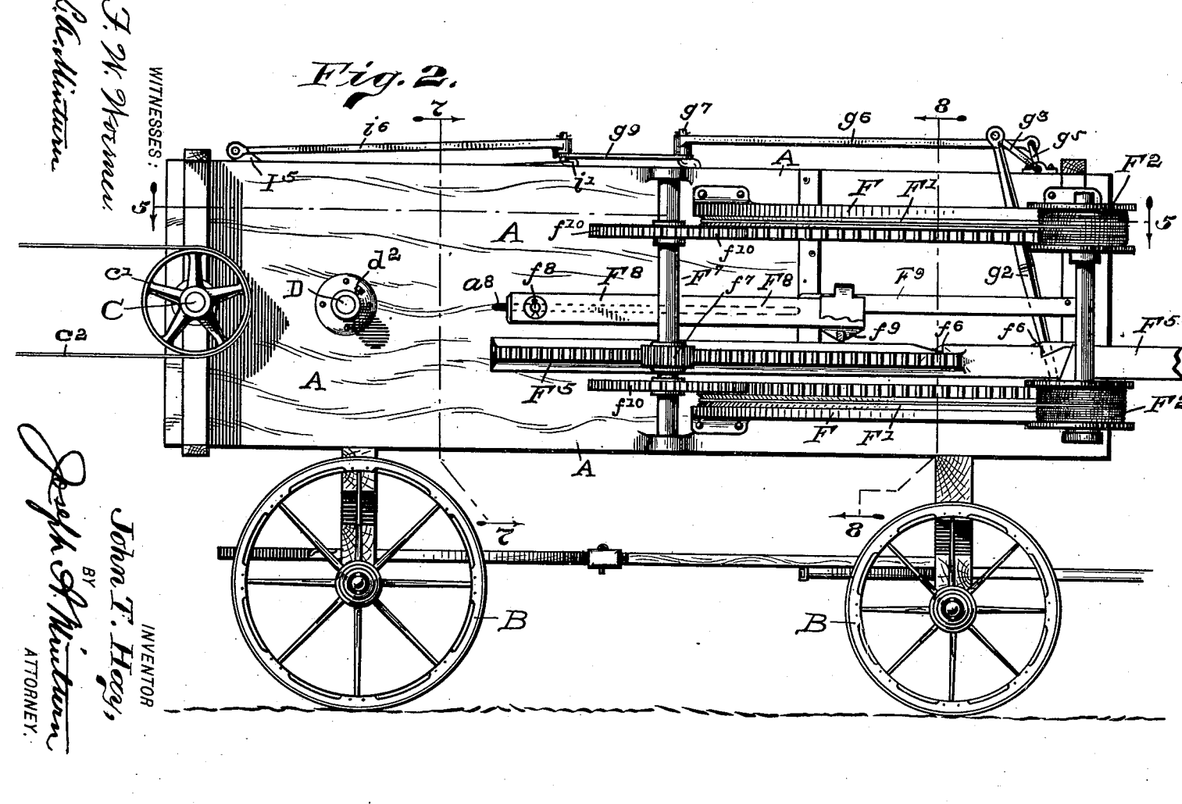
Fig. 2, a right side elevation of same.
Figure 3:
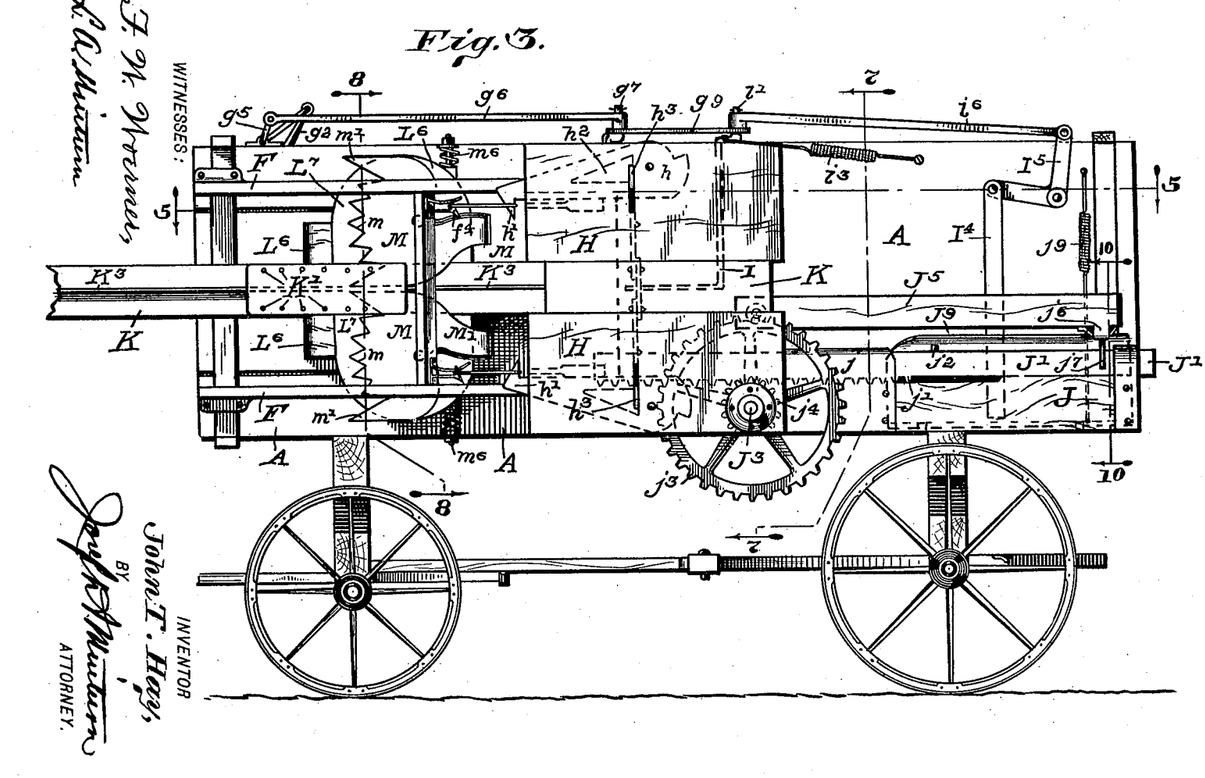
Fig. 3, a left side elevation of same.
Figure 4:
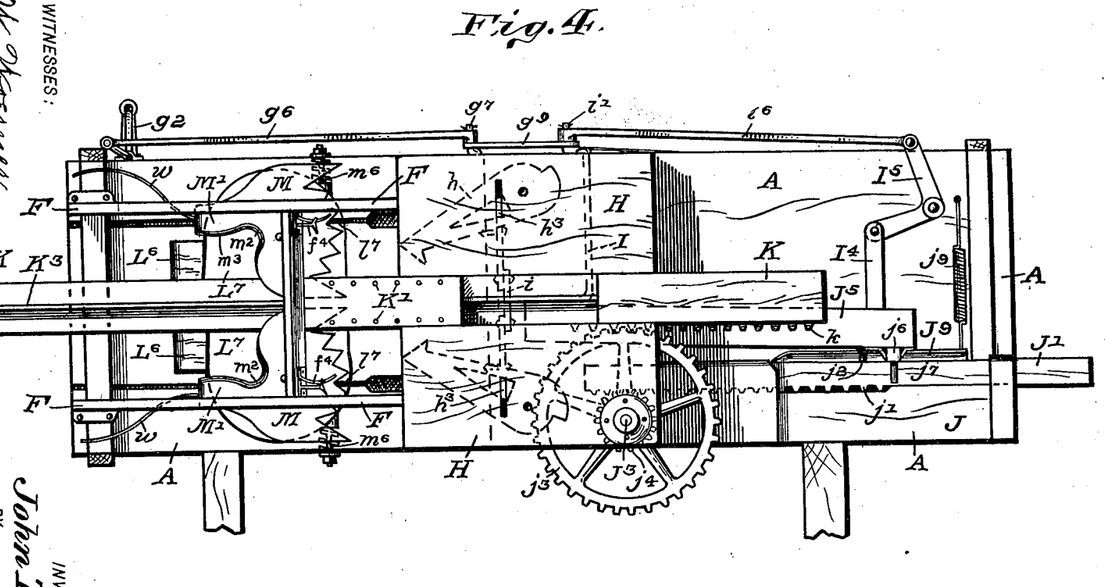
Fig. 4, a view in elevation of the left side of the machine, showing the operative parts in positions assumed immediately prior to the making of the twist in the crossed ends of the bale-band.

Projected from the left of the body A is a side frame having the vertical wall or plate H, parallel with the side of the body and connected thereto by suitable beams. Pivotally secured to the inside of the plate, as shown (partly in dotted lines) in Fig. 3, (see also Figs. 4 and 5,) are the levers $h$, which terminate in the paths of the needles with the hooked ends $h'$, which engage and press the wires against the inner sides of the needle-openings through the frame after the withdrawal of the needles; but during and immediately preceding the occupancy of the openings by the needles the ends of the levers are swung around out of the way. The levers $h$ have the elongated longitudinal slots $h^2$, through which the ends of transverse levers or plates $h^3$ are projected. These lever-plates $h^3$ are practically bell-cranks in shape and purpose and are pivoted to the transverse wall $H^3$ and are connected with each other by the link-bar $h^4$, the opening for one of the pivotal connections being slotted to allow freedom of movement without binding. The link-bar $h^4$ has a central slot $h^5$ to receive the cranked end $i$ of the vertical shaft I. The opposite and upper end of the shaft I has the crank $i'$, approximately at right angles to the lower crank $i$, and the crank $i'$ is connected by the link-bar $g^9$ with the cranked top of the shaft $g^7$, previously described. The crank $i'$ is forced toward the rear of the machine by a spring $i^3$. The tendency of this spring, acting through the several connecting-levers, links, &c., described, is to move the hooked ends of the levers $h$ inwardly or toward each other and to depress the guard G' and this tendency of the levers $h$ inward under the tension of the spring $i^3$ is only resisted by the wires $w$, and the moment the wires $w$ are loosened by being drawn off of one or both of the hooks $f^4$ the mechanism sustained by the wires, obeying the action of the spring, will move to depress the guard G', which in turn will set the mechanism in motion to drive the needles through the press and back. By using the link-bar $h^4$, connected to the two lever-plates $h^3$, as shown, the release of either one of the wires will allow the crank $i$ of the shaft I to swing enough to liberate the mechanism to lower the guard G'. This may occur by some inequality of the bale taking more wire, and it is important that the tie be made when either wire gives out. After the needles have carried the wires across the inner end of the bale it remains necessary to cut off the length needed and to tie the ends together securely. The mechanism for doing this is connected with the top crank $i'$ of the shaft I and will now be described.

J is a horizontal bar parallel with and adjacent to the left rear end of the body A and having a slideway or run on its upper edge housed over in part (beginning at its front end) to receive the sliding rack-bar J'. The housing is shown at $j$. The teeth $j'$ of the rack-bar are on the under front end, and the bar also has the pin $j^2$ on its top side.

$J^3$ is a short shaft mounted between the plate H and the side of the press. It has the gear-wheel $j^3$ and the pinion $j^4$. The pinion $j^4$ meshes with the cogs $j'$ of the rack-bar, and the teeth of the gear-wheel mesh with teeth $k$ (see Fig. 9) on the under side of the rack-bar K, which in turn actuates the band cutting any tying mechanism hereinafter to be described.

The plunger E on its left-hand side opposite the pin $f^8$ carries the similar wrist-pin $e$, which passes through the slot $a^7$ to the outside of the press and pivotally connects the lever $J^5$ to said plunger. The opposite or rear end of the lever $J^5$ has the under side downwardly-projected shell $j^6$ with side fingers $j^7$ extending down on each side of the rack-bar J' to hold the reciprocating lever $J^5$ in line of travel longitudinally of said rack-bar. The opposite sides of the shell or housing $j^6$ are oblique to the lever $J^5$, and its under side is provided with an opening to receive the pin $j^2$, whereby when the pin is seated in the opening in the bottom of the shell the reciprocation of the lever $J^5$ will impart a corresponding longitudinal movement to the rack-bar $J'$. The disengagement of the lever and rack-bar occurs at every forward stroke by the elevation of the shell $j^6$ by the housing $j$, onto which the shell is drawn, leaving the pin $j^2$ in position to be engaged on the return or backward movement of the lever $J^5$; but as this movement is only desired after the bale has been formed and not with every stroke of the plunger I provide the inside horizontal arm $j^8$, (see Fig. 10,) which rides on top of a plate $J^9$, which holds the end of the lever up with its shell out of engagement with the pin. The plate $J^9$ is hinged at its lower edge to the stationary frame of the machine and is substantially in a vertical position when supporting the lever $J^5$. It has the horizontal extension $j^5$, to which the spring $j^9$ is connected in a manner to throw the plate over into the path of the arm $j^8$. The action of this spring $j^9$ is to elevate the outer edge of the extension $j^5$, and consequently to throw the plate $J^9$ out of influence with the arm $j^8$ of the lever $J^5$ a downward pressure sufficient to move the extension $j^5$ is alone necessary. This obtains through the bar $I^4$, which is connected with an arm of the bell-crank $I^5$, and the automatic action synchronized with the passage of the needles $F'$ through the press by the connection of the opposite arm of the bell-crank with the crank $i'$ of the shaft I by the link-bar $i^6$. Thus when the needle contacts with the arm $g^8$ of the shaft $g^7$ the swinging around of the shaft $g^7$ which follows will throw the bell-crank $I^5$ in a direction to depress its bar $I^4$, thereby tilting the plate $J^9$. This happens just before the lever $J^5$ passes off of the housing $j$.

Figure 5:
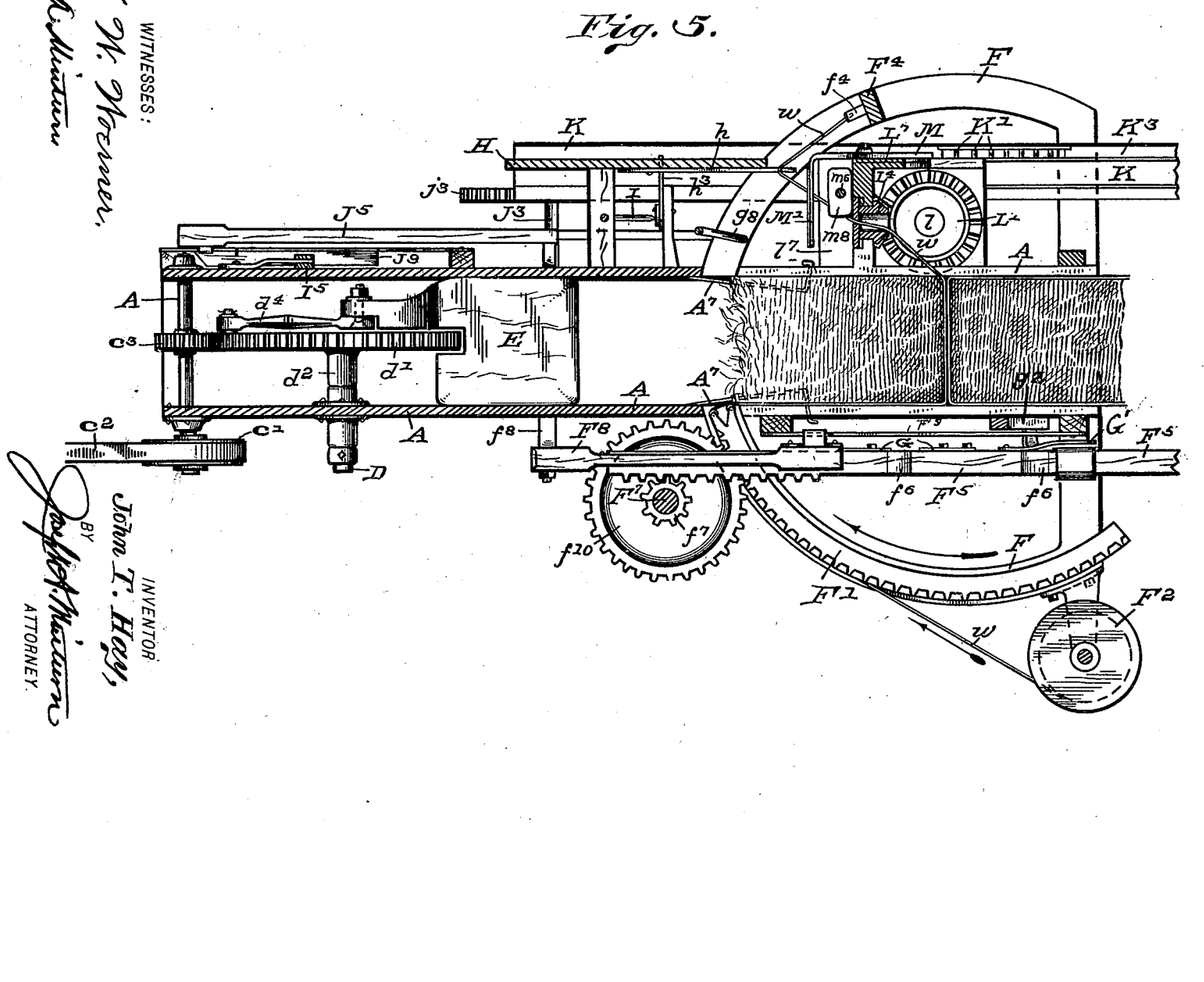
Fig. 5, a horizontal section on the dotted line 5 5 of Figs. 2 and 3 looking down in the direction of the arrows and showing the bale about completed, ready to be wrapped and tied.
Figure 6:
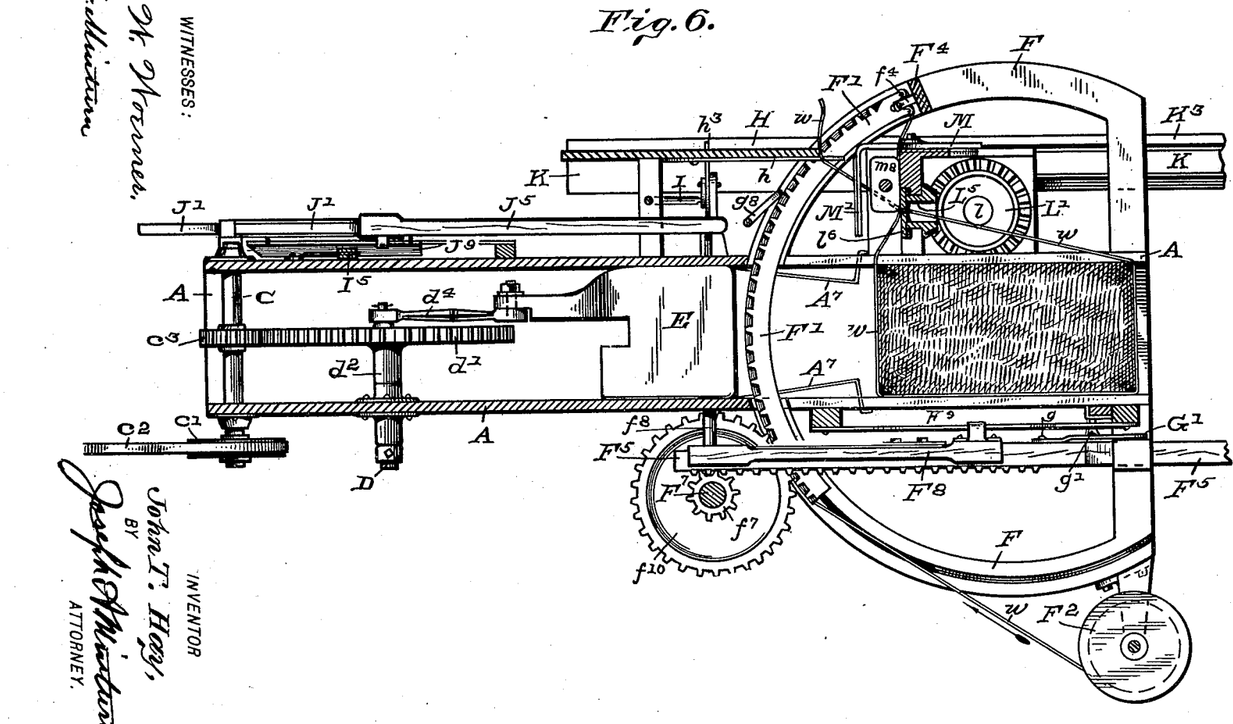
Fig. 6, a like section showing the needle at the end of its inner travel bringing the tie-band across the inner end of the bale. Fig. $6^a$ is an enlarged detail of parts which act to form the loop, showing the tie-wire cut off and the opposite end of the tie looped around the newly-cut end ready to be twisted; Fig. $6^b$, a section on the dotted line $6^b\ 6^b$ of Fig. $6^a$ looking in the direction of the arrows. Fig. $6^b$ shows the quarter-round head $L^7$ and the slot $l^7$.
Figure 6A:
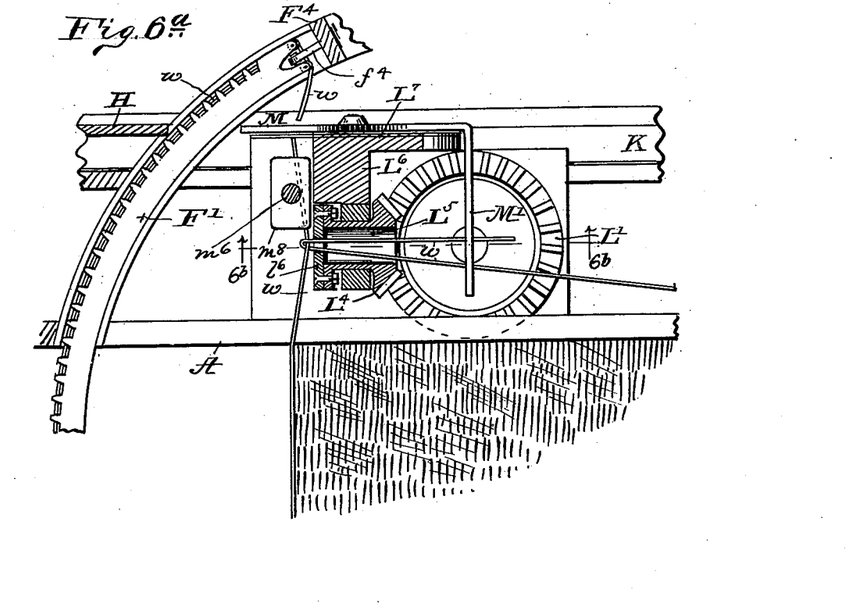
Figure 6B:
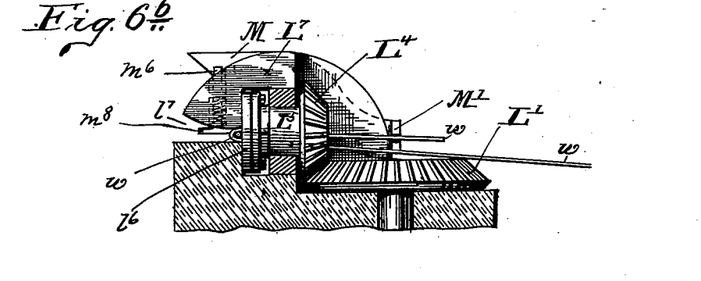
Figure 7:
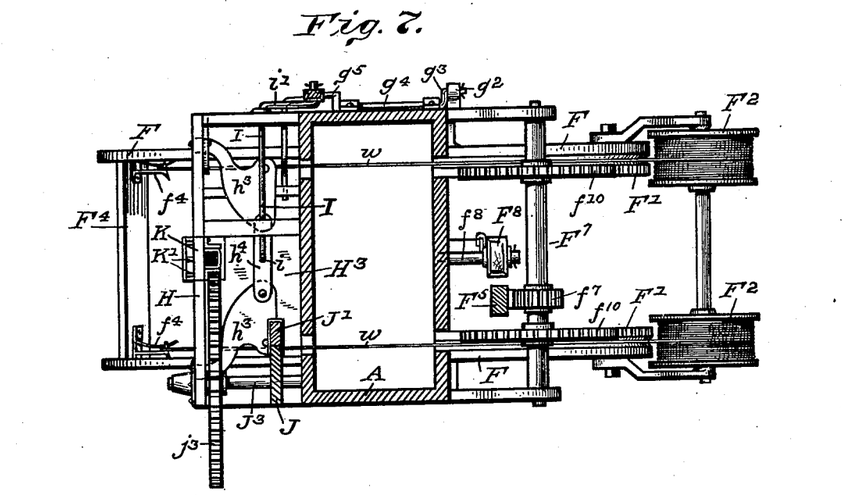
Fig. 7, a vertical transverse section on the dotted line 7 7 of Figs. 2 and 3 looking in the direction indicated by the arrows.
Figures 8, 8A:
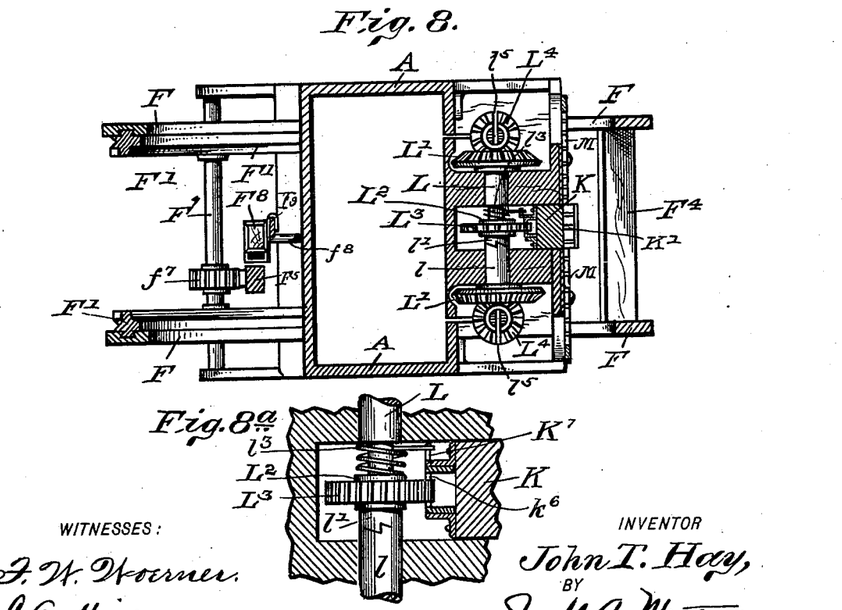
Figures 9, 10, 11, 12, 13, 14:
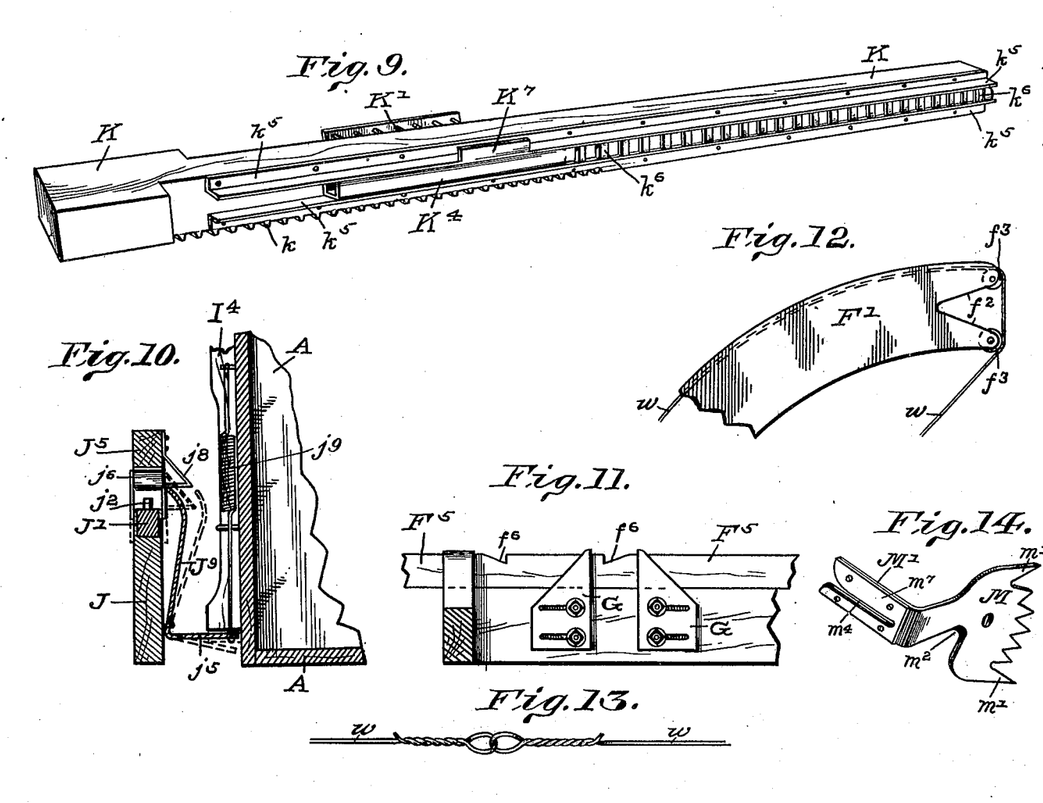

L (best shown in Figs. 1, 5, 6, and 8) is a vertical shaft mounted in suitable boxes between the rack K and the body of the machine A. Mounted on opposite ends of the shaft are the two beveled gear-wheels $L'$, and the hub of one of them (the lower one in the drawings) is a half-clutch $l$, which engages the adjacent end of a corresponding half-clutch $l'$, on the sleeve $L^2$, mounted on the shaft L intermediate of the two wheels $L'$. This sleeve carries the small pinion $L^3$, the teeth of which mesh with the cogs of the rack-bar $K^4$. Above the pinion $L^3$ is a single tooth $l^2$, the purpose of which will be explained later on. A spring $l^3$ presses the sleeve longitudinally into engagement with the clutch-half on the wheel $L'$ below. Because of this clutch construction the shaft L will be rotated in only one direction by the reciprocating rack-bar. Meshing with the cogs of the wheels $L'$ are the smaller beveled toothed wheels $L^4$—one for each of the wheels $L'$. These beveled wheels $L^4$ are mounted each on a hollow shaft $L^5$. These shafts have a longitudinal split $l^5$, which is continued radially through the wheels $L^4$. The journal-boxes in which the shafts $L^5$ are mounted are split and the side of the press A is slotted, all for the purpose of allowing the band-wires $w$ to slip through the sleeves, as shown in Figs. 5 and 6, by being pulled diagonally across from their hooks as the bale is formed. The opposite end of the sleeve from the beveled wheel has the disk $l^6$, with a radial slot just wide enough to admit the wires. This disk $l^6$ is preferably a plate of hardened steel, which is removably secured to the shaft to enable it to be replaced by a new disk when worn by the friction of the wires against the sides of the slot. The shafts $L^5$ are mounted in quarter-round heads $L^6$, which extend toward the rear of the machine about twice the length of the shafts and are slotted horizontally from the ends of the shafts' front, as shown at $l^7$, to allow the wire brought across by the needle to lie in against the ends of said shafts $L^5$. The heads are also provided with the vertical slots $l^8$, which register with the slots $l^5$ in the shafts when the latter are turned to present the slots vertically. Fastened to the outer ends of the heads $L^6$ are the steel plates $L^7$ with horizontal slots registering with those in the heads, and pivotally secured against the outer sides thereof are the shear-plates M, having the circular and concentric row of teeth $m$, which engage the series of pins or teeth $K'$ of the rack-bar K. The teeth $m'$ at each end of the series are extended to form stops by contacting with the longitudinal outside flange $K^3$ of the rack-bar K. The plates M each have deep notches $m^2$, which pass to one side of the pivots on which the plates turn, whereby the edge $m^3$, which is suitably sharpened, will deliver a shear cut to the wire at the bottom of the slots in the plates $L^2$ when the plates M are turned, thereby severing the wire. The plate M next to this cutting edge is continued to form an arm $M'$, which is bent at right angles to the body of the plate to sweep the quarter-round surface of the head $L^6$ by the rocking of the plates M. The end of the arm (see Fig. 14) is slotted and the arm lies during this operation of pressing the bale in a position which allows the band-wire after passing through the hollow shaft to pass into and through this slot $m^4$ of the arm $M'$. When the plate M revolves in the direction to cut off the other end of the wire, the end passing through this slotted arm is carried over with the arm, making a loop over the end just cut off, and the slotted shaft having been brought into proper position the wire brought over by the arm is laid down in the shaft and held there by the arm while the shaft revolves and twists the two ends of the band together. The kind of joint produced is shown in Fig. 13, and so far as I am aware has never been produced by a machine before. By a proper proportioning of the gears and several operative parts the hollow shaft will be made to stop after the rapid twisting motion with its longitudinal slot at the side in alinement with the slot in the body A, whereby the elasticity of the bale will cause the wires to spring in toward it and out of the shaft, and the bale will be pushed out of the press by the formation of the new one behind it.

To make the arm M' more durable, I provide the wearing-plates $m^7$, which are bolted beside the slot to take the wear of the wire band.

To keep the newly-severed end of the wire from being displaced during the twisting operation, I provide the spring-pressed rod $m^6$ with foot $m^8$ to bear down on the wire and hold it with a suitable tension.

The rack-bar K has several novel features which have not been described and which contribute to the successful action of my machine and which I will now fully describe. The teeth $k$ on the under side of the rack-bar K, which mesh with the teeth of the gear-wheel $j^3$, the pins or teeth K' to engage the teeth $m$ and rotate the plates M by the reciprocating movement of the rack-bar, and the flange $K^3$ to form a bearing for the elongated teeth $m'$ and hold the plates against rotation after their teeth have passed the pins K' have all been referred to. At the beginning of the initial movement of the rack-bar the plates M are in position with their arms M' to the rear, and the first action required is for the plates M to rotate forward to cut off the wires and carry the other ends held by the arms M' over to the front; but before the wires can be carried over the shafts $L^5$ must be turned a quarter-revolution to change the slots $l^5$ from horizontal to vertical positions. This last is brought about by the short vertical flange $K^7$, secured to the inner side of the bar K, which when the bar K starts toward the rear of the machine (its first direction of movement) immediately contacts with the lug or tooth $l^2$ of the sleeve $L^2$ and turns the shaft on which the sleeve is mounted a sufficient distance to bring the slots $l^5$ into vertical positions. This flange $K^7$ is best shown in Figs. $8^a$ and 9. Fig. 9, which is a view of the inner side of the rack-bar K, shows clearly the auxiliary rack-bar $K^4$, which slides in the runs $k^5$ longitudinally of the bar K. The teeth $k^6$ of this auxiliary rack-bar engage the teeth of the pinion $L^3$. The purpose of the construction embodying this auxiliary rack-bar is to permit the latter to remain stationary while the arms M' are being thrown forward by action of the rack-bar K upon the toothed plates carrying said arms; but when the shoulder $K^8$ reaches the end of the rack-bar $K^4$ the latter will be carried along and will impart a rotary movement to the pinion on the clutch-shaft, which rotation will be transmitted to the shaft inside of the clutch-sleeve and from thence through the beveled gears to the split shafts which do the twisting of the wires. As a reverse rotation of the split shafts would untwist the wires, the clutch-coupling previously described and above mentioned is provided, which allows the rack-bar K to return without giving motion to the split shafts.

As the operation of my machine has been described in connection with its construction, it will not be necessary to elaborate further, except to call attention to the fact that the operations of placing the bands across the inner end of the bale and of cutting the wires and uniting their ends are all accomplished during a single return stroke of the plunger at the completion of the formation of each bale, and the wires for a new bale are left in right position to begin the immediate formation of the new bale upon the next forward stroke of the plunger allowing the hay or other material to be fed uninterruptedly into the press.

Having thus fully described my invention, what I claim as new, and wish to secure by Letters Patent of the United States, is—

1. In a baling-machine, a needle to reciprocate through the press behind the bale, a carrier to bend one end of the band upon itself around the other, a band-cutter and a band-twister, substantially as described and shown.

2. In a baling-machine, a needle to reciprocate through the press behind the bale to cross one end of the wire over the other, a carrier to double one end of the wire onto itself around the other end of said wire, a wire-cutter and a wire-twister, substantially as described and specified.

3. In a baling-machine, a needle to reciprocate through the press behind the bale, a holder and carrier to hold the free end of the wire to form the band and to carry it around the wire leading to the needle and lay it down on itself, a cutter to sever the wire to the needle and a twister to grasp the doubled wire and twist it on itself to make a double loop joint, in which the ends are crossed, doubled back on themselves and then are twisted, each with its own main body portion, substantially as described.

4. In a baling-machine, a needle, a holder and carrier, a cutter, and a twister, all combined and working together to make a tie for the band of a bale wherein the ends to be joined are crossed and doubled back upon themselves and secured by twisting each end with its own adjacent body portion.

5. In a continuous baling-press, the combination, with a compression-box having wires adapted to extend along the sides and front of the bale in the compression-chamber, of wire-carriers for bringing the wires together at the rear of the bale, and automatic gearing for looping one end of a band-wire around its other end and twisting each end with its own adjacent body portion, substantially as specified.

6. In a baling-press, a compression-box, a reciprocating compressor-head located in the box, needles reciprocating through the press behind the bale and having a longitudinal series of cogs, a reciprocating rack-bar, gearing connecting the teeth of the rack-bar with the teeth of the needles, said rack-bar having a pair of notches with inner straight sides, a hooked lever pivotally connected with the compressor-head and adapted to engage the notches of the rack-bar, means for automatically disengaging the lever from the notches of the rack-bar and means for cutting the bale-bands and tying their ends together, substantially as described.

7. In a baling-press, a compression-box, a compressor-head reciprocating therein, a needle, a rack-bar having notches to engage a hooked lever, a hooked lever actuated from the compressor-head to reciprocate the rack-bar by engagement with the notches, guards adjustable in their positions to disengage the hooked lever with the notches and means for transmitting a reciprocatory movement from the rack-bar to the needle, substantially as described.

8. In a baling-press, a reciprocating compressor-head, a rack-bar having a pair of notches with adjacent straight sides, a hooked lever pivoted to the compressor-head and engaging the notches of the rack-bar, an automatically raising and lowering guard at the front end of the rack-bar to throw the hook out of the notch and a guard intermediate of the ends of the rack-bar to disengage the hook from the notches, substantially as and for the purposes specified.

9. In a baling-press, the combination of a compressor-head, a hooked lever pivotally secured thereto at the end opposite the hook, a longitudinally-reciprocating rack-bar with two notches adapted to be engaged by the hooked lever, and a two-part guard as shown, adapted to be projected into the path of the hook to disengage it from the notches, said parts of the guard being adjustable in their distances apart longitudinally of the rack-bar, as and for the purposes specified.

10. In a bale-tying machine, the combination with a holder for the free end of the wire, a needle to move the other end of the wire across the former, a twister mounted laterally of such crossing on the side opposite said holder, means for doubling the free end back onto itself around the other end of the wire and depositing it in the twister, substantially as described.

11. In a bale-tying machine, the combination with a holder of the free end of the wire, a needle to move the other end of the wire across the said free end, a twister comprising a longitudinally and radially slotted shaft through which the wire to the holder passes, means for doubling the free end of the wire back onto itself around the end just supplied by the needle and depositing it in the slot of the twister-shaft, and means for rotating said slotted shaft substantially as described and shown.

12. In a baling-machine, a holder for the free end of the wire, a needle to move the other end of the wire behind the bale and across the free end of the wire and loop its wire over a stationary hook, a twister, a carrier to loop the free end of the wire held by the holder around the part delivered by the needle and deposit the free end in the twister, a cutter, and automatic mechanism to actuate the several parts, said mechanism being held inert by the tautness of the wire which is destroyed by the drawing of the wire from the said stationary hook at the completion of the bale, substantially as described.

13. In a continuous baling-press, the combination, with wires adapted to stand across the press in front of the bale at the start and then to extend along the sides and front of the bale in the bale-chamber as the formation of the bale pushes them back, spools or reels on one side of the press from which the wires are supplied and hooks or fastenings on the opposite side of the press to hold the free ends of the wires but so they will be released by the pull of the bale, wire-carriers for bringing the wires together at the rear of the bale, automatic wire cutters and twisters to cut the wires and twist them together into bands around the bale, the mechanism for said automatic parts being held inert by the tension of the band-wires and set in action by the withdrawal of one or more of the wires from the fastenings at the completion of the bale, substantially as described.

14. In a baling-press, a compression-box, a compressor-head reciprocating therein, a needle, a rack-bar mounted to reciprocate longitudinally of the compression-box, means for connecting the rack-bar and needle whereby the reciprocation of the bar will impart a longitudinal movement to the needle, said rack-bar having a pair of opposite notches on its upper edge, a hooked bar pivotally secured to the reciprocating compressor-head and adapted, with its hooked end to engage the notches of the rack-bar and guard-plates adjustable in distance from each other, adapted to throw the hook out of the notches, as and for the purposes specified.

In witness whereof I have hereunto set my hand and seal at Indianapolis, Indiana, this 11th day of March, A. D. 1899.

JOHN T. HAY. [L. S.]

Witnesses:
F. W. WOERNER,
L. A. MINTURN.